United States Patent [19]
Patterson

[11] Patent Number: 5,923,379
[45] Date of Patent: Jul. 13, 1999

[54] DSS/DVD PICTURE IN PICTURE WITH INTERNET

[75] Inventor: James T. Patterson, San Jose, Calif.

[73] Assignee: Samsung Electronics Co., Ltd., Suwon, Rep. of Korea

[21] Appl. No.: 08/759,111

[22] Filed: Dec. 2, 1996

[51] Int. Cl.⁶ ............................................. H04N 5/45
[52] U.S. Cl. ..................... 348/565; 348/568; 348/566; 348/589; 348/598; 348/599
[58] Field of Search .................... 348/564, 565, 348/566, 567, 568, 569, 584, 586, 588, 598, 599, 589, 600; H04N 5/45

[56] References Cited

U.S. PATENT DOCUMENTS

| | | | |
|---|---|---|---|
| 5,194,954 | 3/1993 | Duffield | 348/565 |
| 5,233,423 | 8/1993 | Jernigan | 348/564 |
| 5,251,015 | 10/1993 | Rumreich | 348/568 |
| 5,432,561 | 7/1995 | Strubbe | 348/565 |
| 5,481,315 | 1/1996 | Matsunaga | 348/565 |
| 5,543,857 | 8/1996 | Wehmeyer | 348/589 |
| 5,715,014 | 2/1998 | Perkins | 348/565 |

OTHER PUBLICATIONS

Sony Brings the Web to Any TV; Newsbytes via Fulfillment by Individual, Inc. Aug. 27, 1996.

*Primary Examiner*—Sherrie Hsia
*Attorney, Agent, or Firm*—Kenneth L. Sherman, Esq.; Sherman & Sherman

[57] ABSTRACT

A system for providing a user controllable picture-in-picture formatted signal to a television is provided with a fast modem that interconnects the system with a computer network, such as the Internet. In order to allow a user to interact with the Internet, yet still enjoy video programming, the system has a picture-in-picture selection that a user controls to determine which video source (e.g., digital satellite signal, digital video disk signal, Internet graphics) will form the main picture displayed on the television, and which will form the picture-in-picture. A conventional television may be used with the system to display the signal, since it is already formatted in a picture-in-picture format at the output of the system.

20 Claims, 5 Drawing Sheets

DSS/DVD PICTURE IN PICTURE WITH INTERNET

TECHNICAL FIELD OF THE INVENTION

The present invention relates to the field of television displays, and more particularly, to the displaying of video signals from multiple video sources in a picture-in-picture format on a television display.

BACKGROUND ART

The family television has been required in recent years to display video from a number of different sources. These include broadcast television signals received at an outdoor antenna, cable television signals, video signals from a video cassette recorder (VCR), and satellite signals, including analog and digital format signals. A very recent use of television displays is for displaying a connection to a computer network, such as the Internet.

Browsing (or "surfing") the Internet is fast becoming a leading pastime in the United States. People browsing on the Internet often find it somewhat addictive, and spend large amounts of time surfing. Pricing structures which provide unlimited connect time for a fixed fee encourage such use. One of the problems created by heavy Internet usage for Internet surfers is that they often miss their favorite television programming due to their concentration on their surfing activities.

In order to solve this problem, a commercially available system has been proposed by Sony named the WebTV Internet Terminal, and is designed to work with televisions that have Picture-In-Picture (PIP) capability. If an address on the world wide web appears during a program or commercial on the broadcast signal, a viewer is able to access the web site at about the same time as the web site is mentioned. A viewer can watch the television broadcast signal in the Picture-In-Picture while the user is browsing the Web, and enlarge the television signal when something of interest appears on the television signal. A major disadvantage of this system is that it requires a television that has PIP capability, and many televisions in the United States do not have this feature, as many consumers have not opted for this feature in the past, which typically adds significantly to the cost of the television.

Other proposed solutions involve altering the television itself, by providing an "interactive" television with built-in Web browsing capability. These television sets, proposed by Zenith Electronics, include a 28.8 Kbps modem and an Ethernet port. Another system, proposed by Gateway 2000, is an actual computer with television viewing capability.

All of the above-described systems require either a specialized television, or one with PIP capability, and does not account for the millions of televisions currently in use in homes throughout the country, as well as the many models that are still being sold without such capability. A real problem with purchasing a television with such enhanced capabilities is the inevitable need to update the system when the current technology advances. As televisions represent major purchases for most consumers, it becomes prohibitively expensive to replace the television whenever the Web browsing technology makes significant advances.

SUMMARY OF THE INVENTION

There is therefore a need for a system that provides computer network interconnectivity and video signals from other video sources to a conventional television for display.

This and other needs are met by certain embodiments of the present invention which provides a system that selectively connects a plurality of video sources, including video from a computer network, to a television in a PIP format. An integrated circuit in the system accepts the video signals from various sources, and provides an output signal that is selectable to provide the PIP capability on demand. This allows the television to be of conventional design, as the signal arriving at the television input from the system is already in the PIP format, as selected by the user.

An advantage of the present invention is the separation of the PIP function from the television, so that a user is able to browse the Web at the same time as another video signal is being viewed on the television screen, without requiring the television to have the PIP capability itself. Consumers are therefore able to retain their current televisions and use them to browse the Web and simultaneously view a video signal. Alternatively, if purchasing a new television, a consumer is able to avoid expending additional sums to purchase a television with PIP capability.

Another advantage of the present invention is its ability to connect the television to a plurality of different types of video signal sources, including digital satellite systems (DSS), digital video disk (DVD), the Internet, as well as conventional television broadcast signals.

The foregoing and other features, aspects and advantages of the present invention will become more apparent from the following detailed description of the present invention when taken in conjunction with the accompanying drawings.

DETAILED DESCRIPTION OF ILLUSTRATIVE EMBODIMENTS

Figure 1:
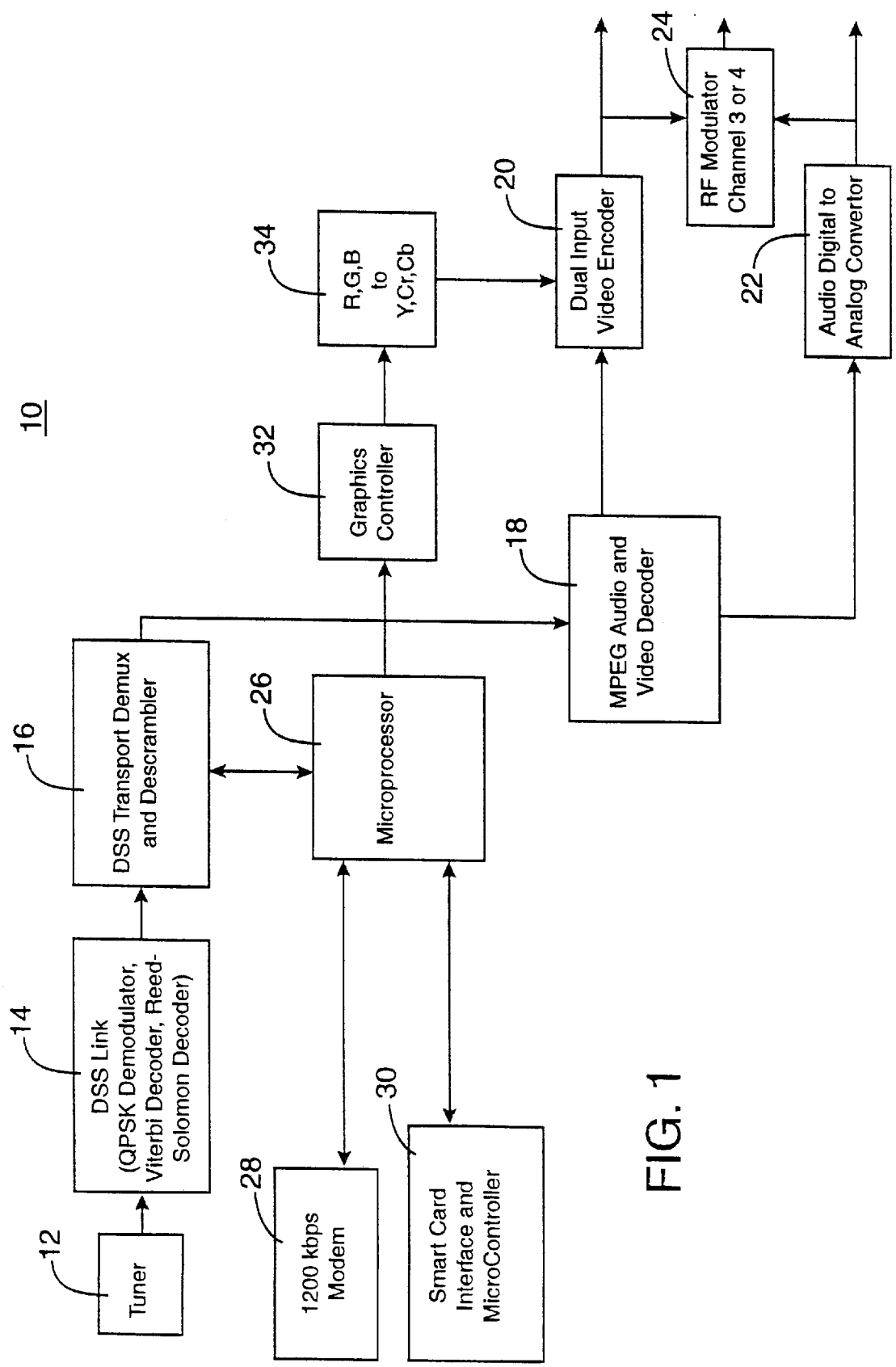
FIG. 1 is a block diagram of a conventional digital satellite system.

FIG. 1 is a block diagram of a conventional digital satellite system 10. The system 10 includes a tuner 12 that receives a digital signal from a satellite dish (not shown) and provides this signal to a digital satellite system (DSS) link 14. The DSS link 14 includes a QPSK demodulator, a Viterbi decoder, and a Reed-Solomon decoder. The DSS link 14 demodulates the digital communication signal from the tuner 12 and converts it to a transport signal.

The transport signal is demultiplexed and descrambled by a DSS transport demultiplexer and descrambler (hereafter the "DSS transport demux") 16. The output of the DSS transport demux 16 is a data stream that includes compressed audio and video signal information. This compressed audio and video information is provided from the output of the DSS transport demux 16 to an MPEG decoder 18. The compressed information is decompressed (i.e., decoded) and separated into a digital audio signal and a digital video signal.

The digital audio signal from the MPEG decoder 18 is provided to an audio digital to analog converter 22 that converts the digital audio signal into an analog audio signal. Similarly, a video encoder 20 receives the digital video signal from the MPEG decoder 18 and converts it into an analog signal. The analog video and auido signals are modulated by an RF modulator 24 for display by a television.

The digital satellite system 10 also includes a microprocessor 26 that controls the system 10 and provides an on-screen display for control by a user through a remote control (not illustrated). The microprocessor 26 interfaces to the digital satellite system provider through a relatively low-speed modem 28, which may be 1200 kbps or 9600 kbps, for example. Also provided is a smart card interface and microcontroller 30 that provides the user with the option of using a smart card to order pay-per-view movies, etc., from the service provider.

The microprocessor 26 is coupled to and controls a graphics controller 32, which generates the graphics for an on-screen display. The graphics to be displayed are provided in R,G,B format to a RGB to YCrCb converter 34 that converts the graphics signal and outputs them to an input of the video encoder 20. In the depicted embodiment of the known system 10, the video encoder 20 is a dual input video encoder.

With the system 10 of FIG. 1, both the digital satellite signals and the graphics are provided for on-screen display. This system is inadequate, however, for use with the Internet, as the communications between the system and a network will be too slow to provide effective Internet access. A system which overcomes this problem, according to an embodiment of the present invention, is depicted in FIG. 2.

Figure 2:
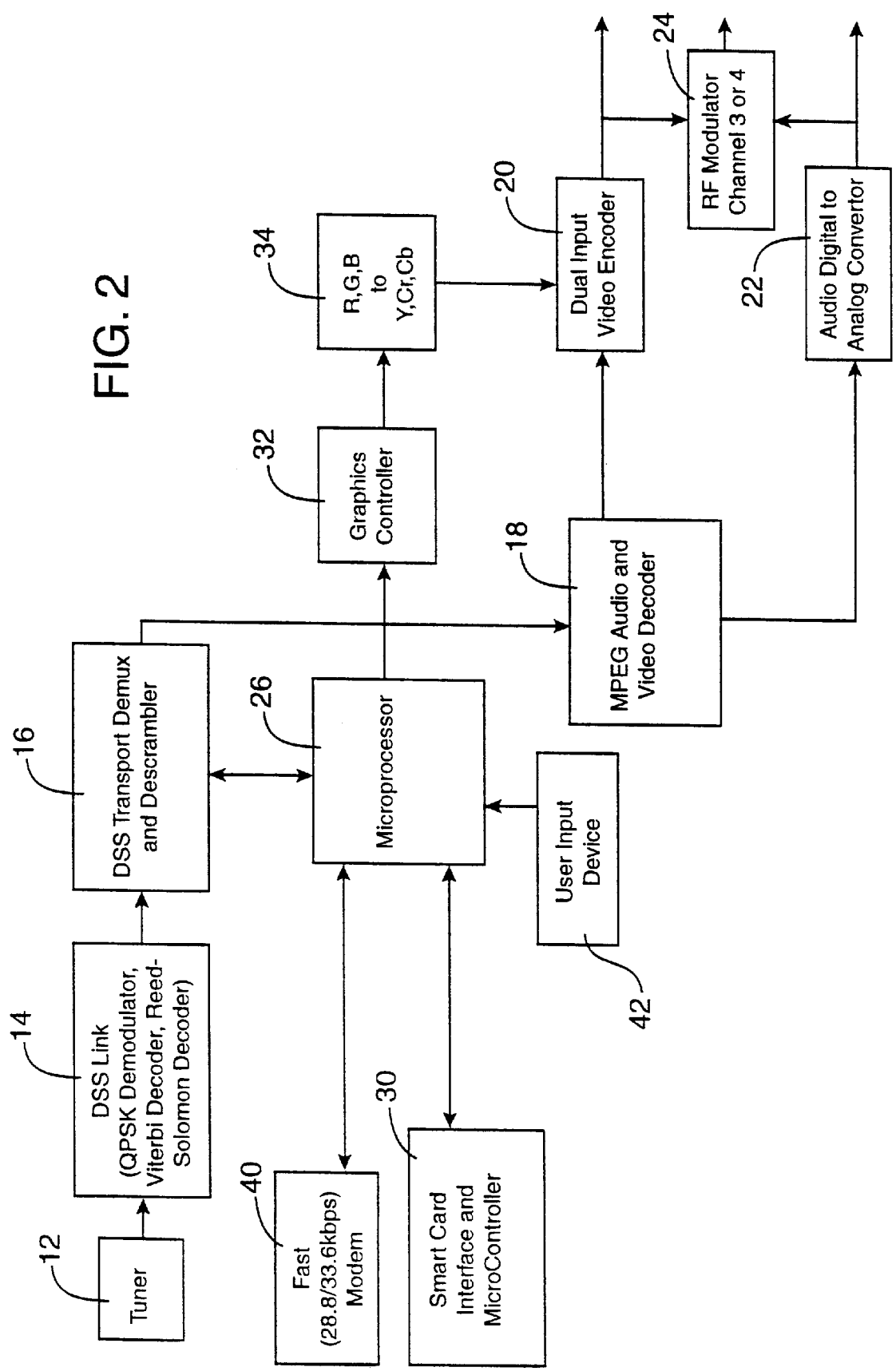
FIG. 2 is a block diagram of a digital satellite system with computer network access, constructed in accordance with an embodiment of the present invention.

The system of FIG. 2 includes many of the same components as that of FIG. 1, and accordingly, have like reference numerals and will not be described again. The relatively slow modem 28 of the known system 10, however, is replaced by a relatively fast modem 40 that is suitable for providing adequate Internet access. An example of an adequate, commercially available modem is a 28.8 or 33.6 kbps modem. Without such speed capability, the system would not provide meaningful access to the Internet, since the images and other data will not be downloaded fast enough from the Internet.

With the system of the present invention depicted in FIG. 2, the microprocessor 26 controls communication with the Internet (or other computer network) through the fast modem 40. The microprocessor 26 communicates this information to the television and the user through the graphics controller 32, the RGB to YCrCb decoder 34, video encoder 20, and the RF modulator 24. Input from the user may be made directly to the microprocessor 26 through an appropriate user input device 42, such as a keyboard or mouse.

Figure 3:
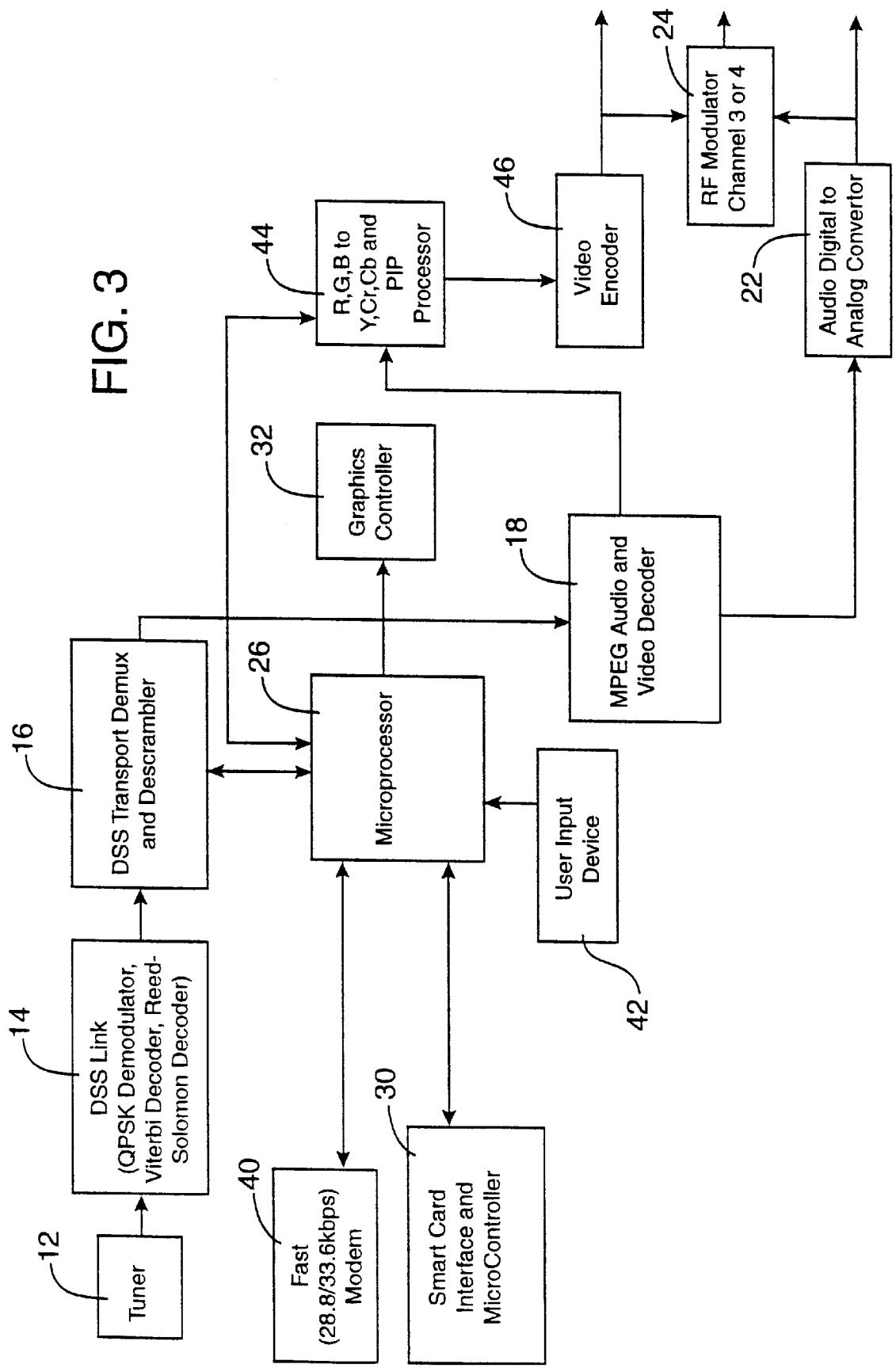
FIG. 3 is a block diagram of a digital satellite system with computer network access and PIP capability, constructed in accordance with an embodiment of the present invention.

FIG. 3 depicts an embodiment of the present invention which provides a user with Internet access, as in the embodiment of FIG. 2, but also provides a Picture-In-Picture (PIP) capability within the system. This has the advantage of providing a PIP formatted signal from the system, so that a conventional television may be used to display Internet data and a digital satellite signal simultaneously, without the need for a television equipped with PIP capability. A user is thus able to surf the Internet while watching satellite programming, switching between which source will be the picture within the picture, and which will be the larger picture. Other types of presentation formats may be used, such as a split-screen presentation.

The embodiment of the system depicted in FIG. 3 includes an RGB to YCrCb converter and PIP processor integrated circuit 44 (hereafter "PIP processor 44"). The PIP processor 44 receives the data received from the Internet through the graphics controller 32. In contrast to the embodiment of FIG. 2, it also receives the digital satellite data from the MPEG decoder 18. The PIP processor 44 performs all of the necessary processing of the two signals in accordance with the control signals provided by the microprocessor 26, as directed by a user. Since the signals from both the MPEG decoder 18 and the graphics controller 32 are provided to the PIP processor 44, which then outputs a single digital signal already PIP formatted, the video encoder 46 need only be a single input video encoder.

Figure 4:
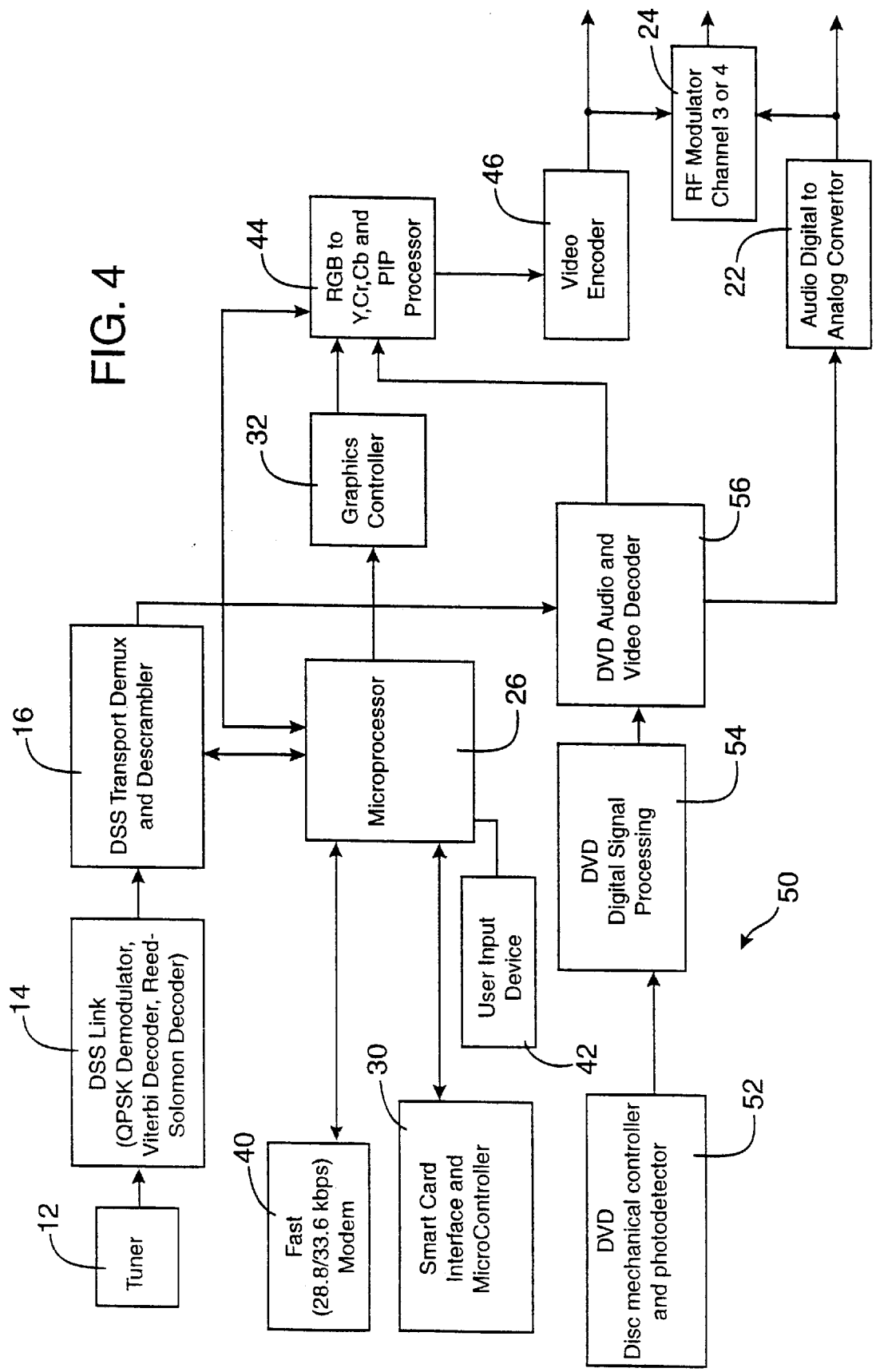
FIG. 4 is a block diagram of an arrangement, constructed in accordance with an embodiment of the present invention, that provides digital satellite signals, digital video disc signals, and computer network signals to a television.
Figure 5:
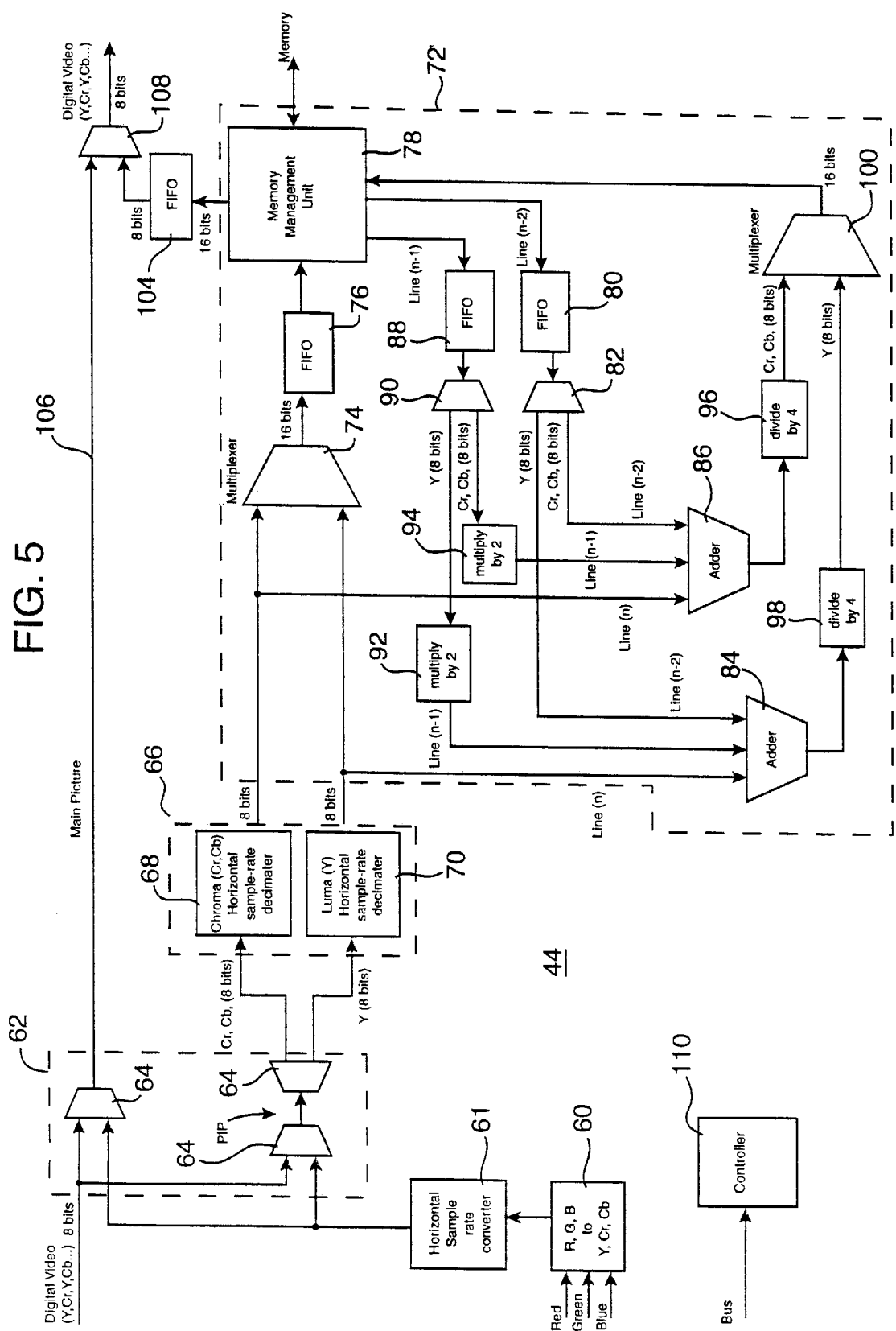
FIG. 5 is a block diagram of a Picture-In-Picture integrated circuit constructed in accordance with an embodiment of the present invention.

A block diagram of the PIP processor 44, constructed in accordance with an embodiment of the present invention, is provided in FIG. 5. The PIP processor 44 includes an RGB to YCrCb converter 60 that receives the graphics signals from the graphics controller 32, thereby converting the signals from the graphics controller 32 into digital signals. The PIP processor 44 also receives digital video signals from one or more sources, such as from the digital satellite system or the DVD player, through the MPEG decoder 18 or a DVD decoder 56 (Shown in FIG.4). Alternatively, an analog signal may be provided from another source, such as conventional cable television, but this signal would need to be converted to a digital signal, by the converter 60, or an additional RGB to YCrCb converter. A first horizontal sample rate converter 61 converts the graphics signal to the same rate as digital video, since these normally have different numbers of pixels within a given area.

A selection arrangement 62 receives the output of converter 60 and the input from the other digital video source. In the exemplary illustrated embodiment, the selection arrangement 62 has three multiplexers 64 which select which video signal (the graphics or the other video signal) will be decimated. The signal to be decimated is passed to a horizontal decimater 66 that contains a chroma (CrCb) decimater 68 and a luma (Y) decimater 70. The decimaters 68 and 70 are conventional decimaters that perform digital signal processing, including digital low pass filterng of the video signal and sub-sampling of the filtered signal. These two functions are typically integrated to form a sample-rate decimater.

The outputs of the chroma horizontal decimater 68 and the luma horizontal decimater 70 are provided to a vertical decimater 72. In the exemplary embodiment of FIG. 5, the vertical decimater 72 is an averaging circuit that averages a plural number of lines, such as three lines, to form a single line in the reduced picture. This three-to-one averaging will be used when the video signal is to be reduced vertically and horizontally to one-third its original size for presentation as a picture in a picture.

In an exemplary embodiment of the invention, the most current line (n) is weighted by ¼, the next most recent line (n-1) is weighted by ½, and the oldest line that is averaged (n-2) is weighted by ¼. The weighted values are then summed to produce the averaged line. To produce this result, however, it is desirable for implementation reasons to multiply the n-1 line by 2, and then divide the summation by 4 to produce the ¼ to ½ to ¼ weighted average.

The 8-bit horizontally decimated chroma and luma samples are provided to a mulitplexer 74 that forms a 16-bit output that is buffered in a first in, first out (FIFO) buffer 76.

A memory management unit 78, coupled to a memory, receives the horizontally decimated samples. Assume that the first line sample is line n-2, the second line sampled is line n-1, and the third line sampled is line n. The memory management unit 78 sends the horizontally decimated samples (both Y and CrCb) to a FIFO buffer 80, which provides a buffered output to a demultiplexer 82 that separates the Y and CrCb signals. The Y signal is provided to an input of a three-input adder 84 that adds the values of the Y samples for the three lines. Similarly, the CrCb signal is provided to an input of another adder 86 that adds the values of the CrCb samples for the three lines.

The memory management unit 78 sends the horizontally decimated Y and CrCb samples of the second sampled line, n-1, to another FIFO buffer 88. The output of the FIFO buffer 88 is separated by a demultiplexer 90 into the Y and CrCb samples of line n-1. The samples are then multiplied by 2 in separate multipliers 92, 94, with the products being provided to the adders 84, 86 at second inputs.

The Y and CrCb samples of line n horizontally decimated, are provided directly to the adders 84 and 86 at first inputs. The Y adder 84 adds the values for the Y samples of the three lines, and the CrCb adder 86 adds the values for the CrCb samples for the three lines. The results of the additions are divided by 4 in separate dividers 96, 98 and multiplexed by multiplexer a 100 to form a 16-bit horizontally and vertically decimated signal. This signal may be buffered in a FIFO buffer (not shown) and then provided to the memory management unit 78, which sends the 16-bit signal for appropriate buffering in FIFO buffer 104.

The main picture is carried on line 106 to a fast switching multiplexer 108, which receives at its second input the output of the FIFO buffer 104, i.e., the reduced picture, in 8-bit portions. The fast switching multiplexer 108, under the control of a controller 110, will switch its output between the main picture signal and the reduced PIP signal appropriately so that the 8-bit output signal contains an image that is already PIP formatted. The controller 110 controls all of the PIP processor 44 functions, although control lines to the individual elements are not depicted in FIG. 5 for reasons of clarity. The controller 110 is responsive to commands from the microprocessor 26 to control selection of which video signal or signals are to be displayed, and which will form the picture-in-picture, and which will form the main picture.

The present invention has been described with the exemplary embodiment of a digital satellite system with Internet access. However, the present invention also relates to other embodiments, in which the video source is other than a digital satellite system. For example, the embodiment of FIG. 4 is a system similar to the embodiment of FIG. 3, but includes an additional source of video. In this exemplary embodiment, a conventional digital video disc (DVD) player 50 is coupled to the system. The DVD player 50 includes a disc mechanical controller and photodetector 52 that receives and plays a disc. The digital video and audio signal from the disc mechanical controller 52 is processed in a DVD digital signal processor 54. The microprocessor 26 is coupled to the DVD signal processor 54. The compressed digital output of the DVD signal processor 54 is provided to a DVD audio and video decoder 56 that decompresses the compressed signal. The DVD audio and video decoder 56 also performs the MPEG decoding function for the signal from the digital satellite system (i.e., from the DSS transport demux 16).

The decompressed signal from the DVD audio and video decoder is provided at one of the inputs to the PIP processor 44, in addition to the input from the graphics controller 32. The PIP processor 44, under the control of the microprocessor 26, selects which signal or signals will be provided to the video encoder 46, and in which format (e.g., full, PIP, split-screen, etc.).

The present invention provides a system having a plurality of video sources that also provides computer network access, and presents these signals for display, either singly or in a combined format. Since the signals have already been appropriately formatted by the system according to the preferences of the user, the television may be a conventional television that does not have the expensive, advanced technology needed to format incoming signals.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A system for providing a display signal to a single input of a television for on-screen display, comprising:

a first source of video signals;

a second source of video signals;

a picture-in-picture (PIP) processor coupled to the first and second sources and selectively formatting the first source video signals and the second source video signals to form the display signal.

2. The system of claim 1, wherein the first source of video signals is a computer network.

3. The system of claim 2, wherein the computer network is the Internet.

4. The system of claim 2, wherein the second source of video signals is a digital satellite system.

5. The system of claim 2, wherein the second source of video signals is a digital video disc player.

6. The system of claim 1, further comprising a microprocessor that controls the PIP processor in response to user input.

7. The system of claim 6, further comprising a graphics controller coupled to the microprocessor to generate graphics from the first source of video signals.

8. The system of claim 1, wherein the PIP processor comprises an RGB to YCrCb converter, a horizontal decimater, a vertical decimater, and a selection arrangement that selects which of the video signals is horizontally and vertically decimated to form a reduced picture and which of the video signals forms a normal size picture, and an output at which the video signals forming the reduced picture and the normal size picture are generated as a single picture-in-picture signal.

9. The system of claim 8, wherein the selection arrangement includes controllable multiplexers that receive the video signals from the first and second sources at multiplexer inputs and selectively provide the video signals from only one of the first or second sources at mulitplexer outputs.

10. The system of claim 9, wherein the vertical decimater includes an averaging circuit that averages a plural number of lines of a video signal.

11. The system of claim 10, wherein the averaging circuit includes a multiplier that multiplies one of the lines, and an adder that adds together the multiplied line with at least one other line to form a summation of the lines, and a divider that divides the summation to produce an averaged line.

12. The system of claim 11, wherein the number of lines that are averaged together by the averaging circuit is three.

13. A picture-in-picture (PIP) processor that receives video signals from a plurality of sources and selectively formats the video signals into a display signal having a format with a first one of the video signals forming a main picture and a second one of the video signals forming a picture-in-picture, the processor comprising:
- a horizontal decimater that receives the video signal that is to form the picture-in-picture and horizontally decimates said video signal;
- a vertical decimater that receives the horizontally decimated video signal that is to form the picture-in-picture and vertically decimates said video signal;
- a selection arrangement that selects which of the video signals is horizontally and vertically decimated to form the picture-in-picture and which of the video signals forms the main picture; and
- an output at which the video signals forming the picture-in-picture and the main picture are generated as a single picture-in-picture signal.

14. A processor according to claim 13, wherein the selection arrangement includes controllable multiplexers that receive the video signals from the plurality of sources at multiplexer inputs and selectively provide the video signals from only one of the sources at mulitplexer outputs.

15. A processor according to claim 14, wherein the vertical decimater includes an averaging circuit that averages a plural number of lines of a video signal.

16. A processor according to claim 15, wherein the averaging circuit includes a multiplier that multiplies one of the lines, and an adder that adds together the multiplied line with at least one other line to form a summation of the lines, and a divider that divides the summation to produce an averaged line.

17. A processor according to claim 16, wherein the number of lines that are averaged together by the averaging circuit is three.

18. The system of claim 1, wherein said single television input is an input of a TV set separate from the system, and said PIP processor provides the display signal formatted thereby, including a PIP format of said video signals from said first source and said second source, to said single television input of said separate TV set,
- thereby eliminating a requirement for said TV set to have a PIP function for simultaneous display of said video signals from said first source and from said second source.

19. A system for providing a display signal to a TV receiver for on-screen display, comprising:
- a first source of video signals;
- a second source of video signals;
- a picture-in-picture (PIP) processor coupled to the first and second sources and selectively formatting the first source video signals and the second source video signals to form a single display signal including therein said video signals from said first source and from said second source in PIP format,
- said system providing said single display signal in PIP format to said TV receiver for display,
- thereby eliminating a requirement for said TV set to have a PIP function for simultaneous display of said video signals from said first source and from said second source.

20. The system of claim 19, further comprising RF modulator means for modulating said single display signal in said PIP format to provide an RF modulated video signal in PIP format to said TV receiver.

* * * * *